United States Patent

[11] 3,581,292

[72] Inventor Robert W. Polkinghorn
Huntington Beach, Calif.
[21] Appl. No. 789,455
[22] Filed Jan. 7, 1969
[45] Patented May 25, 1971
[73] Assignee North American Rockwell Corporation

[54] READ/WRITE MEMORY CIRCUIT
11 Claims, 3 Drawing Figs.

[52] U.S. Cl. .......... 340/173R, 307/279, 307/304
[51] Int. Cl. .......... G11c 11/24, G11c 7/00
[50] Field of Search .......... 340/173, 166; 307/279, 304

[56] References Cited

UNITED STATES PATENTS

| | | | |
|---|---|---|---|
| 2,741,756 | 4/1956 | Stocker | 340/173 |
| 3,111,649 | 11/1963 | Carroll | 340/173 |
| 3,354,321 | 11/1967 | Meyer | 340/166X |
| 3,478,323 | 11/1969 | Rado | 340/173 |

*Primary Examiner*—Terrell W. Fears
*Assistant Examiner*—Stuart Hecker
*Attorneys*—William R. Lane, L. Lee Humphries and Robert G. Rogers

ABSTRACT: Two capacitors of an addressed memory circuit are charged during a write period to a potential representing a logical state. The first capacitor is connected between the output electrode and the control electrode of the MOS device for turning the MOS device on as a function of the logical state of the capacitor. When the input signal is true, during a read period, the voltage on the output electrode of the MOS device is fed back through the first capacitor for increasing the voltage. As a result, the output voltage is driven to a voltage which overcomes the threshold drop through the device. Another MOS device having a relatively larger control voltage is turned on so that the read signal appearing at the output electrode of the first MOS device is read out of the address memory circuit without a reduction due to threshold voltages of the MOS devices involved.

The second capacitor connected between the common input/output line and ground is recharged so that it supplies leakage charge to the first capacitor during write periods when the circuit is not addressed. It is conditionally reset to ground between read and write periods to prevent reading of erroneous information.

INVENTOR.
ROBERT W. POLKINGHORN
BY Robert H Rogers
ATTORNEY

INVENTOR.
ROBERT W. POLKINGHORN
BY Robert G Rogers
ATTORNEY

READ/WRITE MEMORY CIRCUIT

BACKGROUND OF THE INVENTION

1. Field of the Invention

This invention relates to storage circuits and, more particularly, to such circuits using a capacitor storage element to store written information and to provide voltage gain in the read channel.

2. Description of the Prior Art

It is well known that MOS devices have a relatively high threshold voltage drop (from 3 to 6 volts). As a result, a high output voltage requires a relatively high voltage on the control electrodes of the MOS devices. MOS devices may be connected as resistors in a voltage divider network to overcome the problem. However, ratio circuits often require the use of different geometry MOS devices and a relatively increased amount of power is consumed. Power consumption is also increased when capacitors are required to be charged and discharged during a reading period in order to retain the stored information.

It would be preferable if MOS devices could be interconnected in a circuit requiring the use of relatively few MOS devices having a small size and in an embodiment for overcoming the threshold losses of the devices. A memory circuit which includes a nondestructive readout feature would also be preferred since power consumption would be reduced.

The present invention provides a MOS memory device which is not limited due to the threshold voltages of the MOS devices.

SUMMARY OF THE INVENTION

Briefly, the invention comprises a MOS memory circuit including means for charging two capacitors during a write period of a read/write cycle through devices forming an address matrix to a potential representing a logical state. The first capacitor is connected between a control electrode and an output electrode of a MOS device so that the device is turned on as a function of the stored charge.

In one embodiment, a resetting circuit is provided for discharging the inherent capacitance of the address matrix to ground during the memory cycle to prevent the occurrence of reading errors.

The MOS device is turned on to drive its output electrode to a read clock voltage signal on its input electrode minus the threshold loss for the device. However, the voltage is fed back through the capacitor to its control electrode for increasing its output voltage until the threshold loss is overcome. The output voltage is greater than the initial potential stored by the first capacitor.

The second capacitor is charged to the value of the read clock signal. The voltage on the output electrode represents the stored logical state. If a logic zero had been stored, the output would have indicated a ground level.

If another memory circuit is addressed during the following cycle, the charge on the second capacitor supplies leakage current to the previously isolated capacitor.

Therefore, it is an object of this invention to provide a nondestructive MOS memory circuit using an improved ratio-less combination of MOS memory elements.

It is another object of this invention to reset the inherent capacitance of the address matrix to ground during the memory cycle to prevent the occurrence of reading errors.

It is still another object of this invention to provide MOS memory devices using a capacitor for storing logical information and for controlling the voltage level of a signal representing the state of the logical information.

Still another object of this invention is to use a storage capacitor in a "boot strapping" arrangement for increasing the control voltage on a MOS device and for overcoming the threshold voltage of a MOS device.

A still further object of this invention is to charge two capacitors at different times as a function of stored information so that one capacitor can be used to supply leakage current to the other capacitor when the associated memory circuit is not addressed.

These and other objects of the invention will become more apparent in connection with the following drawings.

DESCRIPTION OF THE PREFERRED EMBODIMENTS

Figure 1:
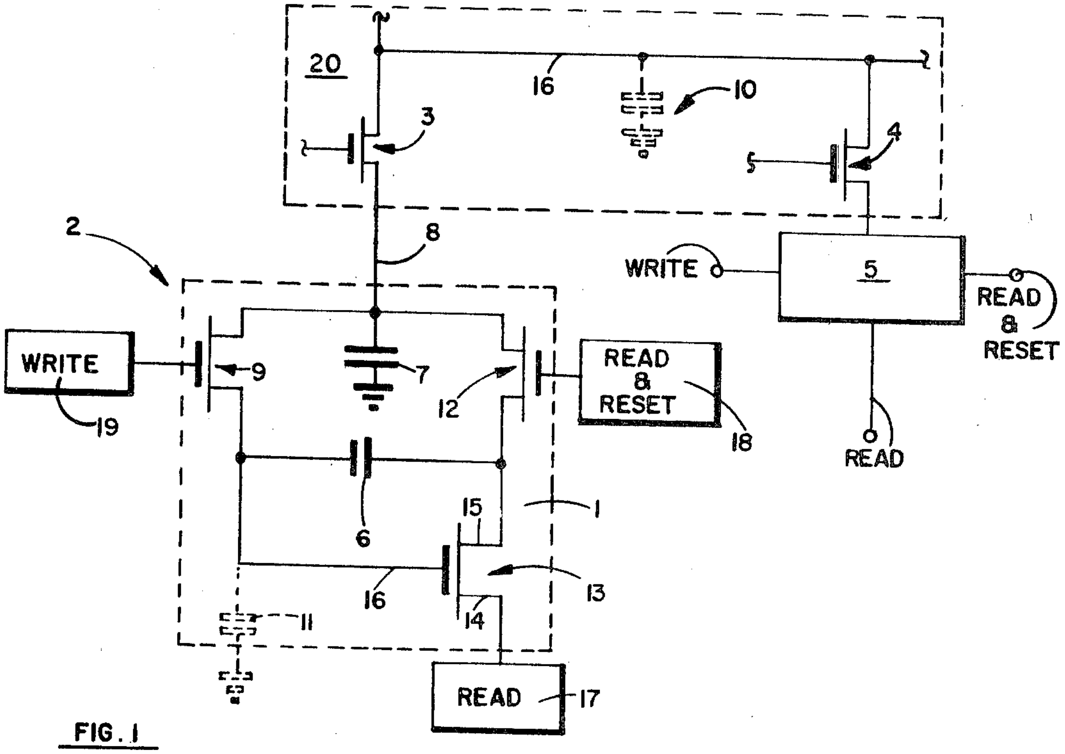
FIG. 1 illustrates one embodiment of the invention.

FIG. 1 illustrates one embodiment of MOS memory circuit 1 comprising part of a partially shown memory system 2. MOS devices 3 and 4 of address matrix 20 (not shown completely) permit the memory device 1 and memory device 5, shown in block form, to be addressed. A practical system would include a plurality of such memory devices and a plurality of MOS devices forming part of address matrix 20 between each memory circuit and input/output terminals (not shown).

Capacitor 6, a discrete capacitor, is connected to the input/output line 8 of circuit 1 through write MOS device 9. The other side of capacitor 6 is connected to the input/output line 8 through read/reset MOS device 12 and is conditionally charged to a discrete voltage level as a function of the voltage on the input/output line. Capacitor 7 is directly connected between ground and the input/output line. Capacitor 10, shown by broken lines, is used to illustrate the inherent capacitance along an input/output line 16 of matrix 20, such as the electrode capacitance of MOS devices 3 and 4 and similar devices which are turned on when writing information into an addressed memory circuit. Capacitor 11, small relative to capacitor 6, is shown by broken lines to illustrate the stray capacitance of circuit 1 to ground.

Figure 2:
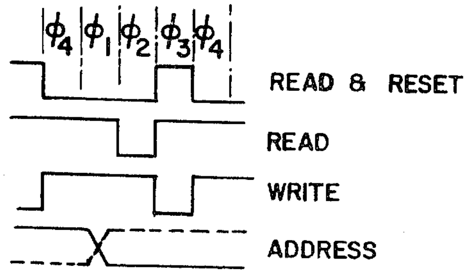
FIG. 2 illustrates control signals used in the FIG. 1 and FIG. 3 embodiment.

Read MOS device 13 is connected to the common connection of capacitor 6 and read/reset MOS device 12. Input electrode 14 of the device 13 is connected to a read clock 17. The read clock generates a signal having a recurring true interval, or negative voltage level, for the FIG. 1 embodiment as shown in FIG. 2. Capacitor 6 is connected between output electrode 15 and its control electrode 16 so that when turned on, the read signal appearing at its source electrode is fed back through capacitor 6 for increasing the control voltage. The read signal initially appearing at its output electrode is reduced by the amount of the threshold voltage of the device 13. However, as the control voltage increases to a second discrete voltage level due to the feedback voltage through capacitor 6, the output voltage is increased to the maximum value of the read signal. As a result, the output voltage from electrode 15 is not limited by the threshold voltage of the device 13 or the initial voltage on the gate electrode. Such an arrangement of the capacitor and MOS device is often referred to as "boot strapping."

The voltage potential on output electrode 15 of device 13 represents the logical state of the information on capacitor 6. It is also used to conditionally reset input/output line 8 to ground by discharging the effective capacitor 10 to ground after information has been written into a memory circuit. Capacitor 7 is discharged at the same time.

FIG. 2 shows the control signals usually used during an operational cycle of the memory device and is used to briefly describe the operation of the FIG. 1 embodiment. For purposes of the description of operation, assume that memory circuit 1 has been addressed. The operation of the FIG. 3 embodiment is the same except for the addition of a MOS device for reasons described subsequently.

During $\Phi_4$, $\Phi_1$, $\Phi_2$ times of a memory cycle, the read/reset signal from read/reset source 18 becomes true and MOS device 12 turns on. Assuming capacitor 6 is charged to a potential representing a logical one, the output electrode 15 of device 13 is connected to ground through its input electrode 14. The read signal from source 17 is false, or ground during $\Phi_4$ and $\Phi_1$ times of the read/reset period. Since the read/reset device is turned on, capacitor 7 and lumped capacitor 10 are discharged to ground so that the lines of the address matrix are neutralized before another reading operation occurs. The charge on capacitor 6 remains isolated since write MOS device 9 is turned off by the false state of the write signal from write signal source 19.

$\Phi_1$ time is the address period for a system. It becomes true between the reset period and the read period and remains true for $\Phi_1$ through $\Phi_4$ times. The address signals to other MOS devices such as MOS device 4 are false, so that the unaddressed MOS circuits are isolated.

During the read time, $\Phi_2$, MOS device 13 is turned on by a negative charge on capacitor 6 and a "true" read signal appears at its output electrode 15. As the MOS device 13 turns on, the voltage on its output electrode 15 continuously increases and is continuously fed back to the control electrode 16 of device 13. As the control electrode voltage increases, the drive for device 13 increases and the output electrode voltage increases to the potential of the read clock signal.

During the read period, read/reset device 12 is turned on so that capacitor 7 is charged to the voltage level of the read clock signal. The output voltage on electrode 15 and the charge on capacitor 7 represent the logical state of the information stored on capacitor 6. That information is read out at an output terminal (not shown) of the memory system.

The read/reset control system signal has a voltage level at least a threshold more negative than the desired output voltage on the input/output line 8. Ordinarily, the read/reset signal and the output voltage on electrode 15 are equal.

If a logical zero has been previously written into capacitor 6, device 13 would have remained off and the input/output line would have remained at ground.

During the write period, $\Phi_3$, if circuit 1 has been addressed, the potential appearing on line 16 from an input terminal (not shown) of the memory system charges the capacitors 6 and 7 as a function of the voltage on the line. For example, if a logical one is to be written, the potential on the line is negative. If a logical zero is to be written, the potential is at ground level.

However, even if the element has not been addressed, device 9 turns on and the charge on capacitor 7 is used to replace charge on capacitor 6 which has "leaked" to ground.

During the time that capacitor 6 is being discharged to ground, as when a logic "0" is being stored, part of the charge cannot be removed since device 13 turns off when its control voltage drops below one threshold. When device 13 turns off, output electrode 15 is electrically isolated (floating). Therefore, capacitor 11 is used to absorb charge from capacitor 6 so that when MOS device 9 is turned off, the voltage on the control electrode of device 13 can be reduced below a threshold level.

It should be noted that although certain of the capacitors are shown as having an electrode connected to ground, electrodes could also be connected to a bias potential to satisfy particular requirements.

Figure 3:
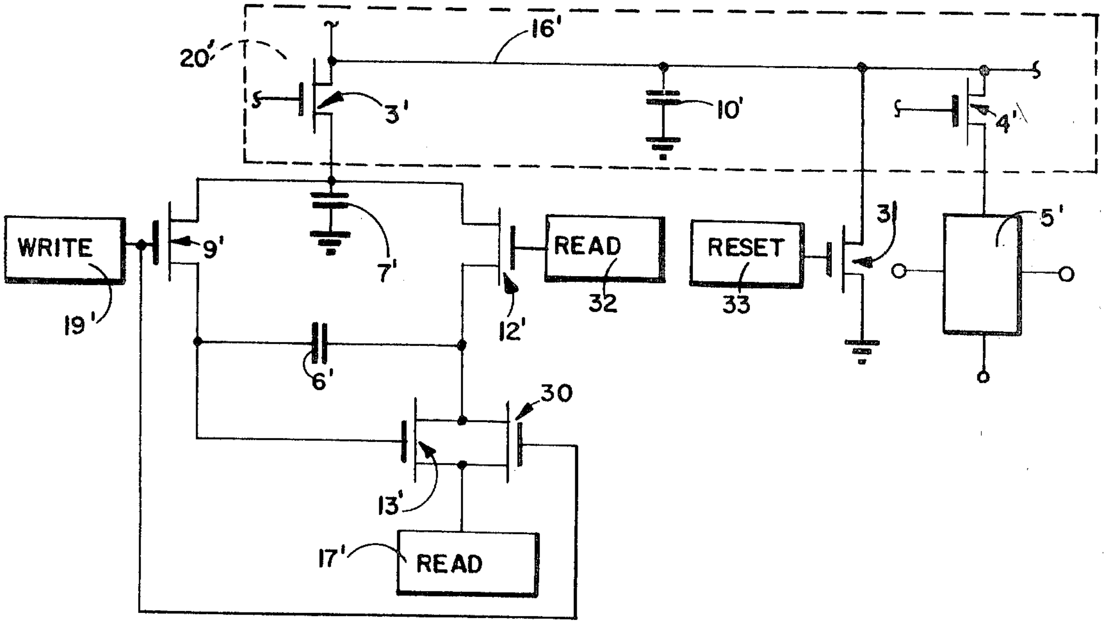
FIG. 3 illustrates the second embodiment of the invention.

FIG. 3 comprises basically the same MOS devices and capacitors as shown in FIG. 1 embodiment except for the addition of write MOS device 30 and reset device 31. Reset signal source 33 is connected to the control electrode of device 31. MOS device 30 is added to provide a ground path for capacitor 6' during a write period so that the capacitor can be completely discharged to ground. Without device 30, the capacitor would retain a small charge approximately equal to the threshold voltage of device 13' and capacitor 11 is required as described above to reduce the voltage.

Device 31 has been added to show an alternate method for discharging capacitor 10' of input/output line 16' of address matrix 20, to ground. By turning the device 31 on during a reset period, $\Phi_4$only, the capacitor can be discharged through the device to ground. As a result, device 12, need not be turned on during the reset period, and only a read clock signal is required for its control electrode.

It should be understood that although MOS switching devices have been illustrated and described, other switching devices such as MNS devices, MNOS devices and other enhancement modes field effect devices can also be used.

Although the invention has been described and illustrated in detail, it is to be understood that the same is by way of illustration and example only, and is not to be taken by way of limitation; the spirit and scope of this invention being limited only by terms of the appended claims.

I claim:

1. In combination:
output means,
first field effect transistor means having a first electrode, a second electrode, and a control electrode, said first electrode being connected to said output means during certain time intervals for providing output voltage levels equivalent to voltage levels on said first electrode,
a storage capacitor connected between said first electrode and said control electrode for feeding back changes in voltage levels on said first electrode to said control electrode,
second field effect transistor means for connecting voltage levels representing logic states to the control electrode of said first field effect transistor means and to the storage capacitor during one time interval, and for isolating said control electrode and storage capacitor from said voltage levels during subsequent time intervals, said storage capacitor storing a charge equivalent to said voltage levels,
means connected to the second electrode of said first field effect transistor means for providing voltage levels to said first electrode during said one time interval and during a subsequent time interval as a function of the voltage levels of said storage capacitor.

2. The combination recited in claim 1 including a third field effect transistor means connected in electrical parallel with said first field effect transistor means, said third field effect transistor means being conductive during said one time interval for connecting the first electrode of said first field effect transistor means to a voltage level, said storage capacitor storing charge representing the difference between the voltage level on said control electrode of said first field effect transistor and the voltage level on the first electrode of said first field effect transistor during said one interval.

3. A memory system having a storage circuit comprising:
switching device means having an output electrode and a control electrode,
capacitor means for storing a potential representing a logical state during a first interval, said capacitor means connected between said output electrode and said control electrode and said control electrode for feeding back voltage on the output electrode to said control electrode during a subsequent interval,
said switching device means being responsive to said potential for driving said output electrode to a voltage representing a logical state as a function of the potential stored by said capacitor means during said first interval and as a function of the voltage fed back through said capacitor means to its control electrode from its output electrode during said subsequent interval.

4. The combination recited in claim 3 wherein:
said first interval is a recurring write interval, said memory system further including write means for providing said potential to said capacitor means from an input during the write interval when said storage circuit is addressed and for restoring any leakage charge to said capacitor means during subsequent write intervals when said storage circuit is not addressed, said write means electrically isolating said capacitor means from the input during other intervals.

5. The combination recited in claim 3, including:
an input/output conductor connected to said storage circuit, said switching device means comprising a first field effect transistor, a second field effect transistor connecting said input/output conductor to the output electrode of said first field effect transistor when said output electrode is at an electrical ground voltage level.

6. The combination recited in claim 5, wherein said first interval is a write interval of a memory read/write cycle and said storage circuit further includes a third field effect transistor conductive during said write interval for connecting said input/output conductor to said capacitor means for storing a potential representing a logic state, said third field effect transistor being nonconductive between write intervals of consecutive memory read/write cycles for isolating said capacitor means from potentials representing logic states when said circuit is not addressed by said memory system said third field effect transistor being conductive during each write interval even if said circuit is not addressed for supplying leakage charge to said capacitor means.

7. The combination recited in claim 5 wherein said second field effect transistor includes a control electrode connected to a signal which has a voltage level for overcoming the threshold voltage loss across said second field effect transistor when said second field effect transistor is conducting.

8. The combination recited in claim 3, including a plurality of said storage circuits connected in a memory system having an address matrix for addressing selected ones of said storage circuits.

9. The combination recited in claim 3 wherein said memory system includes an address matrix for addressing said storage circuit and a resetting field effect transistor connected between said matrix and electrical ground and having a control electrode, means connected to said control electrode for turning said resetting field effect transistor on during a memory cycle for discharging the inherent capacitance of said matrix to electrical ground.

10. A MOS storage circuit comprising MOS device means and having an output electrode and a control electrode capacitor means, means for initially charging said capacitor means to a potential representing a logical state, said capacitor means being connected between the output electrode and the control electrode of said MOS device means for feeding back voltage on said output electrode for increasing the drive voltage on said control electrode, said MOS device means responsive to the charge on said capacitor means for driving its output electrode to a voltage level representing said logical state, said voltage level being in excess of said initial potential.

11. The combination recited in claim 10 wherein said means for initially charging said capacitor means comprises a field effect transistor rendered nonconductive after said initial charging for electrically isolating said capacitor means until said capacitor means is recharged.